(12) United States Patent
Delmas et al.

(10) Patent No.: US 10,160,823 B2
(45) Date of Patent: Dec. 25, 2018

(54) PHENOLIC RESIN OBTAINED BY POLYCONDENSATION OF FORMALDEHYDE, PHENOL AND LIGNIN

(71) Applicant: COMPAGNIE INDUSTRIELLE DE LA MATIERE VEGETALE-CIMV, Neuilly sur Seine (FR)

(72) Inventors: Michel Delmas, Auzeville-Tolosane (FR); Bouchra Benjelloun Mlayah, Pompertuzat (FR)

(73) Assignee: COMPAGNIE INDUSTRIELLE DE LA MATIERE VEGETALE-CIMV, Neuilly sur Seine (FR)

( * ) Notice: Subject to any disclaimer, the term of this patent is extended or adjusted under 35 U.S.C. 154(b) by 11 days.

(21) Appl. No.: 14/900,293

(22) PCT Filed: Mar. 26, 2014

(86) PCT No.: PCT/EP2014/056035
§ 371 (c)(1),
(2) Date: Dec. 21, 2015

(87) PCT Pub. No.: WO2014/206586
PCT Pub. Date: Dec. 31, 2014

(65) Prior Publication Data
US 2016/0369033 A1  Dec. 22, 2016

(30) Foreign Application Priority Data

Jun. 26, 2013  (FR) ...................................... 13 56125

(51) Int. Cl.
| | | |
|---|---|---|
| C08H 6/00 | (2010.01) |
| C08G 8/38 | (2006.01) |
| C08H 7/00 | (2011.01) |
| C08G 8/24 | (2006.01) |
| C08G 16/02 | (2006.01) |
| C09J 161/12 | (2006.01) |
| C09J 161/06 | (2006.01) |

(52) U.S. Cl.
CPC ................ C08G 8/38 (2013.01); C08G 8/24 (2013.01); C08G 16/0293 (2013.01); C08H 6/00 (2013.01); C09J 161/06 (2013.01); C09J 161/12 (2013.01)

(58) Field of Classification Search
None
See application file for complete search history.

(56) References Cited

U.S. PATENT DOCUMENTS

| | | | | |
|---|---|---|---|---|
| 2,360,376 A * | 10/1944 | Van Epps | ................ | C08G 8/08 428/529 |
| 2,364,721 A * | 12/1944 | Kassay | .................. | C08L 97/02 106/164.3 |
| 2,405,450 A * | 8/1946 | Salvesen | .................. | C08H 6/00 530/507 |
| 2,405,451 A * | 8/1946 | Salvesen | .................. | C08H 6/00 530/507 |
| 2,437,981 A * | 3/1948 | Stephan | .................. | C08G 8/10 524/428 |
| 2,507,465 A * | 5/1950 | Ayers | ....................... | C08H 8/00 106/164.01 |
| 2,574,784 A * | 11/1951 | Heritage | ................ | C09J 161/06 156/335 |
| 2,574,785 A * | 11/1951 | Heritage | ................ | C09J 197/02 106/164.5 |
| 2,675,336 A * | 4/1954 | Stephan | .................. | C08G 8/28 428/529 |
| 2,727,869 A * | 12/1955 | Ash | ........................ | C09J 161/06 524/15 |
| 2,781,286 A * | 2/1957 | Ayers | .................... | C09J 161/06 428/529 |
| 2,781,327 A * | 2/1957 | Ayers | .................... | C09J 161/06 524/35 |
| 2,781,328 A * | 2/1957 | Ayers | .................... | C09J 161/06 523/129 |
| 3,017,303 A * | 1/1962 | Ayers | .................... | C09J 161/00 106/123.12 |
| 3,093,607 A * | 6/1963 | Ayers | .................... | C09J 161/00 106/162.5 |
| 3,189,566 A | 6/1965 | Akira et al. | | |

(Continued)

FOREIGN PATENT DOCUMENTS

| | | |
|---|---|---|
| DE | 42 26 330 A1 | 7/1993 |
| EP | 1 180 171 B1 | 10/2003 |

(Continued)

OTHER PUBLICATIONS

Biopolymer Lignin, Proteins, Bioactive Nanocomposites, Springer, Abe et al., 2010 p. 8.*

(Continued)

*Primary Examiner* — Peter A Salamon
(74) *Attorney, Agent, or Firm* — Young & Thompson

(57) ABSTRACT

A lignin-phenol-formaldehyde resin, which is obtained by polycondensation of formaldehyde, phenol and lignin in the presence of a basic or acidic catalyst, is characterized in that the lignin is a lignin that is not chemically modified at the available functional groups. This lignin has a low molecular mass and includes available functional groups chosen from the group including aliphatic hydroxyls and phenolic hydroxyls. The degree of substitution by weight of phenol with the lignin is between 50% and 60%. The weight proportion of the lignin and of phenol in the resin is equal to the weight proportion of phenol in a lignin-free phenol-formaldehyde (PF) resin.

11 Claims, No Drawings

(56) References Cited

U.S. PATENT DOCUMENTS

| | | | | |
|---|---|---|---|---|
| 3,213,045 | A * | 10/1965 | Klein | C09J 161/06 |
| | | | | 428/529 |
| 3,268,460 | A * | 8/1966 | Miller | C09J 161/06 |
| | | | | 524/596 |
| 3,389,101 | A * | 6/1968 | Jarvi | C08G 8/28 |
| | | | | 524/16 |
| 3,429,770 | A * | 2/1969 | Ayers | C09J 161/06 |
| | | | | 106/406 |
| 4,201,700 | A * | 5/1980 | Chen | C08G 8/24 |
| | | | | 525/414 |
| 4,303,562 | A * | 12/1981 | Hollis, Jr. | C08G 8/28 |
| | | | | 156/335 |
| 4,306,999 | A * | 12/1981 | Adams | C08G 8/28 |
| | | | | 524/735 |
| 4,320,036 | A * | 3/1982 | Gobran | C08L 61/06 |
| | | | | 524/14 |
| 4,769,434 | A * | 9/1988 | Van der Klashorst | C08G 8/38 |
| | | | | 527/400 |
| 5,177,169 | A * | 1/1993 | Schroeder | C08H 6/00 |
| | | | | 527/400 |
| 5,202,403 | A * | 4/1993 | Doering | C08G 8/38 |
| | | | | 525/54.42 |
| 9,464,152 | B2 * | 10/2016 | Dahlhaus | C08G 8/10 |

FOREIGN PATENT DOCUMENTS

| | | |
|---|---|---|
| EP | 1 877 618 B1 | 1/2008 |
| EP | 2 580 246 A1 | 4/2013 |
| WO | 00/23490 A1 | 4/2000 |
| WO | 2011/154293 A1 | 12/2011 |

OTHER PUBLICATIONS

Molar mass determination of lignins by size exclusion chromatograph: Towards standardization of the method, Baumberger et al., vol. 61, pp. 459-468, 2007 (Year: 2007).*

International Search Report, dated Aug. 14, 2014, from corresponding PCT application.

* cited by examiner

PHENOLIC RESIN OBTAINED BY POLYCONDENSATION OF FORMALDEHYDE, PHENOL AND LIGNIN

TECHNICAL FIELD OF THE INVENTION

The present invention relates to a novel use of a pure and non-degraded biopolymer of natural polyphenol type represented by a particular lignin.

The present invention relates to the use of this lignin for the production of a synthetic resin of the "phenolic" resin type by replacement in large proportions of phenol, or a derivative thereof, with this particular lignin, in a "replacement proportion" of 1 to 1 by weight.

PRIOR ART

Phenolic resins are thermosetting resins obtained by polycondensation of formol (or formaldehyde) and phenol (or a derivative thereof, cresol, resorcinol, xylenol, etc.).

Phenoplasts or phenol-formaldehyde resins (abbreviation: PF) are derived from formaldehyde and phenol, and the synthesis of phenol-formaldehyde polymers, which uses formaldehyde as comonomer, is similar to that of aminoplasts.

In a first step, the precursors (also known as prepolymers or oligomers, which constitute the resin) of the final polymers are formed via a start of polycondensation (release of water) of the formaldehyde with the phenol (or certain substituted derivatives thereof, such as cresols).

In the second step of the production, the final structure of the macromolecules is obtained by crosslinking, at about 150° C.

A drawback of phenolic resins is especially their toxicity, during manufacture, due to the high levels of residual phenol and formaldehyde monomers, despite the attempts by manufacturers, who make every effort to reduce this aspect.

This is especially the case for "Resol" resins, which are obtained by reaction of a phenol with an aldehyde in the presence of a basic catalyst. This is also the case for "Novolac" resins, produced in the presence of an acid catalyst.

Phenol-formaldehyde resins adhere perfectly to wood, paper and textiles based on cellulose fibres.

Phenol-formaldehyde adhesives or resins are in the form of concentrated solutions of resin in alcohol, and also as solutions and as aqueous emulsions.

Some of them are presented in the form of a powder that is soluble in water or alcohol. These adhesives are easy to use and also show great strength of the joint, which is often stronger than the wood itself, and also good stability with respect to ageing, bad weather and moulds.

Numerous attempts to reduce the amount of phenol used in phenol-formaldehyde resins or PF resins are known.

Among these attempts, it has already been proposed to prepare a resin comprising lignin for the production of an LPF resin partly comprising lignin.

Lignin is a natural polyphenol derived from the combination of three monomers: p-coumaryl, coniferyl and sinapyl alcohol in p-hydroxyphenyl, guaïacyl and syringyl units, respectively. Ortho positions of the aromatic cycle are partially free in case of guaïacyl and p-hydroxyphenyl units. Thus an electrophilic substitution of these sites by formaldehyde is possible. Moreover, the highly cured aromatic structure of lignin has some similarities with the formo-phenolic network. Then the partial replacement of phenol by lignin in the synthesis of resol resins has been a wide source of interest.

In 1965, patent U.S. Pat. No. 3,189,566 proposed the use of lignin in the production of a phenolic resin in a reaction of "Novolac" type using papermaking lignin, the lignin being a partial substituent of the phenol which is used and reacted with formaldehyde.

In 1981, patent U.S. Pat. No. 4,306,999 proposed the use of papermaking lignin for replacing phenol. The said document indicates that adhesive or resin manufacturers are not equipped to use powders and thus require a lignin product in liquid form. Furthermore, the phenol-formaldehyde reaction requires the use of lignin solutions of low viscosity in order to avoid the excess of water.

In order to make the lignin more "soluble", the said document proposed to produce a concentrated lignin solution of determined viscosity by dissolution using a solvent comprising water and phenol, which thus goes against the objective consisting in eliminating the phenol. In addition, patent U.S. Pat. No. 4,320,036 (1982)—for the production of a Novolac resin—proposed proportions of mixture of a PF Novolac resin and of an alkaline lignin and of a binding agent.

In 1988, patent U.S. Pat. No. 4,769,434 identified the characteristic problems of lignins for their integration into phenolic resins by especially identifying the low reactivity of papermaking alkaline lignins. This results from the insufficient number of sites available on each lignin fragment to react with formaldehyde. The said document identified the need to have more than 0.4 reactive site with a value of 0.6, starting from bagasse.

The said document mentioned in its abstract the objective consisting in replacing 25% to 100% of the phenol in the production of a raw material resin required for the preparation of the resin used in adhesives for the manufacture of wood-based products.

The said document thus indicated the difficulties in using lignin, but the methods proposed in that document, such as ultrafiltration or chemical modification of lignins to improve the reactivity, are technically or industrially unsatisfactory.

U.S. Pat. No. 5,177,169, for the use of lignin in resins or adhesives instead of phenol, indicates that the use of a product obtained from wood would enable wood industrialists to control the availability of "demethylated" lignin as a whole.

U.S. Pat. No. 5,202,403 (1993) concentrated on the performance qualities required for an LPF resin and proposed to prepare a resin precursor with a low level of alkalinity which is then placed in contact with lignin.

To date, despite the teachings of these documents, there is no solution that can be performed industrially allowing a substantial substitution of the amount of phenol in a resin of phenoplastic type in order to arrive at the production of an LPF resin which satisfies all the criteria mentioned previously relating to its industrial production and implementation, especially while conserving all the advantages and characteristics of PF resins.

To date, the only degrees of substitution that have been able to be obtained and implemented industrially are only of the order to 20% by weight (100% of phenol replaced with 20% of lignins and 80% of phenol).

The novel use according to the present invention lies in the use of a particular lignin derived from a plant raw material, especially wheat straw, and which is composed of linear low molecular weight oligomers which behave like phenolic oligomer and polymer homologues.

The novel use of the present invention was made possible because pure and undegraded lignin (referred to herein below as "Biolignin™" or "CIMV Lignin"), i.e. a lignin that is not chemically modified at the available functional groups, is prepared via a process—referred to herein below as the "CIMV process"—that is fully controlled and described in particular in the CIMV patent EP-B1-1 180 171.

This process for producing paper pulp, lignins, sugars and acetic acid is characterized in that it comprises the following successive steps consisting in:

(i) placing the annual or perennial plants, which are used in total or partly, and which constitute the starting lignocellulosic raw material, in the presence of formic acid containing at least 5% by weight of acetic acid which is brought to a reaction temperature of between 50° C. and 115° C.;

(ii) next, separating at atmospheric pressure the solid fraction constituting the paper pulp from the organic phase, especially containing in solution the starting formic and acetic acids, dissolved monomeric and polymeric sugars, lignins and acetic acid derived from the initial plant raw material; the said process also comprising a preliminary step consisting in (iii) performing a preliminary impregnation of the plant matter at atmospheric pressure and at a temperature at least 30° C. below the reaction temperature.

The paper pulp obtained then undergoes one or more additional operations of placing in contact with acetic acid between 50° C. and 115° C.

The humidity of the initial lignocellulosic material is less than or equal to 25% by weight of water relative to the dry matter.

Milling of the lignocellulosic raw material is performed so as to reduce it to fragments or chips with a length substantially between 0.5 and 20 cm.

The impregnation by immersion is performed for a time of 10 to 30 minutes in the formic acid/acetic acid mixture used during the fractionation reaction.

The formic acid and acetic acid are separated from the pulp, the lignins and the sugars by evaporation under vacuum.

The liquid/sugar mixture is taken up in water and then filtered to separate the precipitated lignins from the acidic liquid aqueous phase.

CIMV patent EP-B1-1 877 618 describes an installation for performing an optimal and economic implementation of this process by especially making it possible to selectively extract the products such as the lignins and the sugars, and especially the said lignin not chemically modified at the available functional groups.

The said document thus proposes an installation for performing the process for producing paper pulp, lignins and sugars, in which:

the annual or perennial plants, which are used in total or partly, and which constitute the starting lignocellulosic raw material (MP) are, in an impregnation step, placed in contact with a mixture of organic acids;

next, in a fractionation step, the solid fraction constituting the paper pulp is separated from the organic phase especially containing in solution the starting organic acids, dissolved monomeric and polymeric sugars, and lignins derived from the initial plant raw material;

the impregnation and fractionation are performed at atmospheric pressure;

the installation being characterized in that it comprises: means for passing the raw material, from upstream to downstream, successively at a first post and at least one second post for treating the raw material which are consecutively arranged from upstream to downstream and constituting a first pair of consecutive treatment posts, each treatment post comprising:

"impregnation" means for, at the first post, temporarily placing the raw material in contact with an amount of a first mixture, known as the impregnation mixture, of organic acids, and for, at the second post, temporarily placing the raw material in contact with an amount of a second impregnation mixture of organic acids; and means for, after impregnation, at least partially recovering the said amount of second mixture after impregnation and for reusing at least part of the second mixture recovered to constitute at least partly the said first impregnation mixture used at the first post.

Each post comprises means for, after impregnation, sampling part of the said amount of second mixture in order to extract therefrom especially lignins derived from the initial plant raw material.

The possibility of sampling, for the purpose of extraction(s) at each treatment post, offers many advantages.

It makes it possible especially to extract lignins of distinct and known molecular weights, these lignins being able to be characterized, in a known manner, especially by mass spectrometry.

Also, CIMV patent application EP-A1-2 580 246 proposes a process for separating lignins and sugars from an extraction liquor, known as the extracted liquor, comprising, in the form of dry matter (MS), lignins and sugars, characterized in that it consists in:

a) concentrating the extracted liquor, especially by evaporation, to obtain a concentrated liquor containing dry matter in a proportion of between 60% and 70% by weight;

b) preparing a solution by mixing the concentrated liquor with water, in equal parts by weight;

c) stirring the mixture to prepare a dispersion of the lignins in the mixture and to obtain stable suspension of the lignins in the solution;

d) filtering the solution comprising the lignins in suspension, especially by means of a filter press, in which process:

the said mixture is prepared by introducing the concentrated liquor into water;

the solution temperature, during the suspension, is between 50° C. and 60° C.

Stirring of the solution is performed by placing in rotation.

After the filtration step d), the filtered material is dried to obtain lignin powder, the particle size of which is between 20 and 50 microns.

The dry matter contains, on a weight basis, about 50% of lignins and about 50% of sugars and other products.

Characterization studies performed especially by Michel Delmas and Bouchra Mlayah Benjelloun furthermore made it possible to establish the structure and functionality of the CIMV lignin thus prepared, the research results of whom were published in the following documents:

A "Functionality of Wheat Straw Lignin Extracted in Organic Acid Media, Journal of Applied Polymer Science" in Vol. 121 491-501(2011);

B "Structural elucidation of the wheat straw lignin polymer . . . " in JOURNAL OF MASS SPECTROMETRY 2003; 38: 900-903;

C "Elucidation of the complex molecular structure of wheat straw lignin polymer . . . " in RAPID COMMUNICATIONS IN MASS SPECTROMETRY 2007; 21: 2867-2888.

The lignin in accordance with the use according to the invention is distinguished in that it is not chemically modified, and in that its functional groups, especially the phenol groups, are "available".

DETAILED DESCRIPTION OF THE INVENTION

The invention proposes a thermosetting synthetic resin, known as LPF, or lignin-phenol-formaldehyde, which is obtained by polycondensation of formaldehyde, phenol and lignin in the presence of a basic or acidic catalyst, characterized in that the lignin is a lignin that is not chemically modified at the available functional groups. In the present invention "lignin that is not chemically modified at the available functional groups" means a lignin known as "Biolignin™" or "CIMV Lignin" as defined and characterized according to the teachings of the documents mentioned previously.

The said lignin has a low molecular mass whose Mw is between 700 g/mol and 2000 g/mol and preferably equal to 1500 g/mol.

The said lignin comprises available functional groups chosen from the group comprising aliphatic hydroxyls and phenolic hydroxyls.

The aliphatic hydroxyls are present in a proportion of from 1.0 mmol/g to 3.0 mmol/g, and preferably in a proportion of from 1.5 mmol/g to 3.0 mmol/g.

The phenolic hydroxyls are present in a proportion of from 1.1 mmol/g to 2.0 mmol/g and preferably in a proportion of a content not less than 1.5 mmol/g.

The resin has a degree of substitution by weight of the phenol with the said lignin which is between 50 and 70%, and preferably between 50% and 60%.

The weight proportion of the said lignin and of the phenol in the resin is equal to the weight proportion of phenol in a phenol-formaldehyde (PF) resin not containing lignin.

The production of this novel LPF resin is similar to that of a phenoplast or phenol-formaldehyde PF resin of the prior art, or of an LPF resin of the prior art with a low degree of substitution or replacement by weight of the phenol with a lignin.

The said particular lignin known as "Biolignin™", or "CIMV Lignin", is used by predispersing it in phenol, the phenol-CIMV Biolignin mixture then being used in the same manner as "lignin-free" phenol in a PF resin.

The weight proportion of the said lignin in the composition of the resin is equal to the weight proportion of phenol in a "standard" phenol-formaldehyde PF resin.

The resin is synthesised with a formaldehyde to phenol and lignin ratio (F/(P+L)) between 35 and 60%, preferably between 45 and 50%, and optimally of 47%.

The said lignin or "Biolignin™" or "CIMV Lignin" is produced according to the CIMV processes and by means of a CIMV installation as described previously. For example, said lignin or "Biolignin™" or "CIMV Lignin" is extracted from wheat straw.

It can be characterized by its physicochemical properties: molecular weight, dry matter, acidity, ashes, Lignin Klason and residual hemicelluloses contents. An example of such lignin can be:

TABLE 1

| example of Biolignin ™ Composition | |
|---|---|
| Molecular weight | Mn 890 g/mol, Mw 1720 g/mol |
| Dry matter | 95% |
| Acidity | 3.22% |
| Ashes content | 1.22% |

TABLE 1-continued

| example of Biolignin ™ Composition | |
|---|---|
| Klason content | 88.5% |
| Residual hemicelluloses content | 5.15% |
| Protein contents | 8.4% |

This lignin is supplied for its use for the industrial preparation of the novel resin according to the invention under entirely satisfactory conditions, especially in the form of a powder that is able to be dispersed in phenol.

The term "degree of substitution by weight" refers herein to the weight proportion of phenol of a phenol-formaldehyde PF resin, substituted with "Biolignin™" or "CIMV Lignin".

By way of examples, the functional groups of "Biolignin™" or "CIMV Lignin" may be quantified in the following manner.

EXAMPLE 1 (2012)

TABLE 2

Quantification of a first example of Biolignin ™
Molecular weight of the Biolognin ™ = 1500 g/mol

| | Aldehyde | Acetyl | Hydroxyls | Total |
|---|---|---|---|---|
| Hydroxyls (phenolic + aliphatic) | 0.60 | 0.50 | 2.90 | 4.00 |
| Phenolic hydroxyls | 0.20 | 0.05 | 0.85 | 1.10 |
| Aliphatic hydroxyls | 0.40 | 0.45 | 2.05 | 2.90 |

(mmol/g of Biolignin ™)

EXAMPLE 2

TABLE 3 example of Biolignin ™ of Quantification of functional groups of Biolignin by NMR analysis

| Aliphatic formylated hydroxyl | 0.41 mmol/g of Biolignin ™ |
|---|---|
| Aliphatic acetylated hydroxyl | 0.46 mmol/g of Biolignin ™ |
| Total Aliphatic hydroxyl | 1.11 mmol/g of Biolignin ™ |
| Total phenolic hydroxyl | 1.74 mmol/g of Biolignin ™ |

In this second example of Biolognin™, the total free phenolic hydroxyls can be distributed in the three units (p-hydroxyphenyl, guaïacyl and syringyl) constituting the lignin as follows:

TABLE 4

Repartition of the phenolic hydroxyls groups in the three monomeric units

| | Phenolic hydroxyl | Syringyl unit | Guaïacyl units | p-Hydroxyphenyl units |
|---|---|---|---|---|
| Biolignin ™ | 1.74 mmol/g | 0.70 mmol/g | 0.86 mmol/g | 0.18 mmol/g |

1.5 mmol of phenolic hydroxyls of "Biolignin™" or "CIMV Lignin" allows a degree of substitution of the phenol with lignin equal to about 50% by weight.

Fives resins PF (phenol-formaldehyde resins) and LPF (Lignin-phenol-formaldehyde resins) were synthesized with different phenol substitution contents by lignin (w/w).

The reaction time at 90° C. was set in order to reach a specified viscosity. The higher was the substitution of phenol by Biolignin™, the shorter was the reaction time.

The characteristics of four resins LPF1, LPF2, LPF3 and LPF4) and the standard resin (PF1) are shown in the following table. These resins reached the viscosity, dry matter and pH requirements for industrial PF

TABLE 5

Characteristics of different PF and LPF synthesized from the same formulation with different substitution rate.

| | substitution rate | Reaction time (min) | pH | Viscosity P (25° C.) | Dry Matter |
|---|---|---|---|---|---|
| industrial requirements of an adhesive resin | | | 11-12 | 300-800 cP | >45% |
| PF1 reference | 0% | 52 min | 11.8 | 3.1 P | 47.0% |
| LPF1 | 20% | 45 min | 11.6 | 4.2 P | 47.3% |
| LPF2 | 30% | 35 min | 11.7 | 4.7 P | 47.4% |
| LPF3 | 50% | 15 min | 11.4 | 4.1 P | 47.9% |
| LPF4 | 60% | 12 min | 11.5 | 4.8 P | 47.1% |

Preferably the residual free formaldehyde content of the resins has to be under 0.2% to respect industrial requirements.

The formaldehyde to (phenol+lignin) ratio (F/(P+L)) is between 35 and 60%, preferably between 45 and 50% and optimally 47% for a 50 to 70%, preferably 50 to 60% Biolignin™-based resin.

Table 6 presents the characteristics of 50% substituted LPF synthesized with different formaldehyde to phenol and lignin ratio. The reaction time was fixed at 15 min. Each one of the six LPF resins reaches the standard resin requirements in terms of pH and viscosity. Moreover, with initial formaldehyde to phenol and Lignin ratio between 35 and 60%, the substituted resins present characteristics which are closed to all industrial requirements.

TABLE 6

Evolution of residual formaldehyde according initial mass ratio formaldehyde/(Phenol + Lignin)

| | Initial F/(P + L) (w/w) | pH | Viscosity (25° C.) | Residual formaldehyde |
|---|---|---|---|---|
| LPF 5 | 79.8% | 11.7 | 2.5 P | 8.1% |
| LPF 3 | 64.0% | 11.4 | 4.1 P | 4.4% |
| LPF 6 | 56.6% | 11.6 | 3.2 P | 2.7% |
| LPF 7 | 49.7% | 11.5 | 4.1 P | 1.1% |
| LPF 8 | 47.1% | 11.5 | 5.2 P | 0.5% |
| LPF 9 | 39.9% | 11.7 | 5.5 P | 0.2% |

By way of example, the characteristics of an optimized LPF resin (LPF 10) according to the invention with a degree of substitution of 50% by weight and a formaldehyde to (phenol+lignin) ratio of 47% are as follows:

TABLE 7

Characteristics of an optimized LPF resin (LPF 10)

| substitution content | F/ (P + L) | reaction time | Dry matter | Viscosity (25° C.) | pH | residual formaldehyde |
|---|---|---|---|---|---|---|
| 50% | 47% | 21 min | 48.10% | 3.4 P | 11.9 | 0.18% |

By way of example, the composition, expressed on a weight basis, of an LPF resin according to the invention with a degree of substitution of 50% by weight is as follows:

TABLE 8

Formulation of an example of LPF resin

| Water | Urea | Phenol | Biolignin | NaOH | Formaldehyde |
|---|---|---|---|---|---|
| 48% | 2.7% | 12.1% | 12.1% | 7.3% | 17.2% |

The LPF resins according to the invention based on "Biolignin™" or "CIMV Lignin" have the same thermomechanical profile as a PF industrial resin (reference).

Thus, as non-limiting examples of such a composition:

TABLE 9

Comparative tests performed on wood panels by means of resin according to the invention

| Resin | Reference PF | Biolignin/phenol 60%/40% | LPF 10 |
|---|---|---|---|
| Maximum Young's modulus (MPa) | 1500 | 1314 | 1720 |
| Temperature (° C.) | 139 | 150 | 143 |

Comparative tests performed on wood panels (particle boards) by means of a resin according to the invention reveal results, characteristics and performance qualities at least equal to those obtained with a standard industrial adhesive/PF resin.

By way of non-limiting example, the optimized LPF 10 resin was tested in particle board manufacturing. Panels have been characterized and compared with industrial requirements. Results are as follow in Table 10. The mechanical properties of the panels obtained reach the industrial requirements for particle boards, especially in terms of traction, flexion and module.

TABLE 10

Biolignin ™ based particle boards characteristics compared with industrials requirements

| | % dry resin | pressing temperature (° C.) | Density | traction (N/mm$^2$) | Flexion (N/mm$^2$) | Module (MPa) |
|---|---|---|---|---|---|---|
| LPF10 | 9% | 190° C. | 681 | 0.39 | 13.8 | 2337 |
| Requirements | | | | 0.3 | 13 | 2050 |

The invention claimed is:

1. A thermosetting synthetic resin, known as a lignin-phenol-formaldehyde resin, or LPF resin, which is obtained by polycondensation of formaldehyde, phenol and lignin in the presence of a basic or acidic catalyst, wherein the lignin is a lignin that is not chemically modified at the available functional groups, and said available functional groups comprising aliphatic hydroxyls and phenolic hydroxyls.

2. The resin according to claim 1, wherein the lignin has a low molecular mass whose Mw is between 700 g/mol and 2000 g/mol.

3. The resin according to claim 1, wherein the aliphatic hydroxyls are present in a proportion of from 1.5 mmol/g to 3.0 mmol/g.

4. The resin according to claim 1, wherein the phenolic hydroxyls are present in a proportion of from 1.1 mmol/g to 2.0 mmol/g.

5. The resin according to claim 1, wherein the resin comprises a degree of substitution by weight of phenol with the lignin which is between 50 and 70%.

6. The resin according to claim 5, wherein the resin is synthesised with a formaldehyde to (phenol+lignin) ratio (F/(P+L)) between 35 and 60%.

7. The resin according to claim 2, wherein the lignin has a low molecular mass whose Mw is equal to 1500 g/mol.

8. The resin according to claim 4, wherein the phenolic hydroxyls are present in a proportion not less than 1.5 mmol/g.

9. The resin according to claim 5, wherein the degree of substitution by weight of phenol with the lignin which is between 50% and 60%.

10. The resin according to claim 6, wherein the resin is synthesised with a formaldehyde to (phenol+lignin) ratio (F/(P+L)) between 45 and 50%.

11. The resin according to claim 10, wherein the resin is synthesised with a formaldehyde to (phenol+lignin) ratio (F/(P+L)) of 47%.

\* \* \* \* \*